United States Patent
Lee et al.

(10) Patent No.: US 10,209,805 B2
(45) Date of Patent: Feb. 19, 2019

(54) INTEGRAL SENSING APPARATUS FOR TOUCH AND FORCE SENSING AND METHOD FOR THE SAME

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 30 days.

(21) Appl. No.: 15/470,907

(22) Filed: Mar. 28, 2017

(65) Prior Publication Data
US 2017/0285832 A1    Oct. 5, 2017

(30) Foreign Application Priority Data
Apr. 1, 2016   (TW) .............................. 105110673 A

(51) Int. Cl.
*G06F 3/041*    (2006.01)
*G06F 3/044*    (2006.01)

(52) U.S. Cl.
CPC .......... *G06F 3/0414* (2013.01); *G06F 3/044* (2013.01); *G06F 2203/04103* (2013.01); *G06F 2203/04107* (2013.01); *G06F 2203/04111* (2013.01)

(58) Field of Classification Search
CPC .................. G06F 3/0414; G06F 3/044; G06F 2203/04103; G06F 2203/04107; G06F 2203/04111
See application file for complete search history.

(56) References Cited

U.S. PATENT DOCUMENTS

| 2015/0041778 A1 | 2/2015 | Chang et al. |
| 2015/0242041 A1* | 8/2015 | Sugita ..................... G06F 3/044 345/174 |

(Continued)

FOREIGN PATENT DOCUMENTS

| CN | 102096515 A | 6/2011 |
| TW | 201227052 A | 7/2012 |
| TW | M517870 U | 2/2016 |

OTHER PUBLICATIONS

Office Action dated Oct. 25, 2016 of the corresponding Taiwan patent application.

*Primary Examiner* — Lisa S Landis
(74) *Attorney, Agent, or Firm* — Chun-Ming Shih; HDLS IPR Services

(57) ABSTRACT

An integral sensing apparatus for touch and force sensing includes a touch electrode layer having first touch electrodes and second touch electrodes arranged, a protection layer arranged on one side of the touch electrode layer, a force electrode layer having at least one force sensing electrode, a resilient dielectric layer arranged between the touch electrode layer and the force electrode layer, and a capacitance sensing module. In touch sensing operation, the capacitance sensing module sequentially or randomly sends a touch driving signal to selected ones of the second touch electrodes, and sequentially or randomly receives a touch sensing signal from selected ones of the first touch electrodes. In force sensing operation, the capacitance sensing module sends a force capacitance-exciting signal to the at least one force sensing electrode and obtains a force sensing signal from the force sensing electrode.

23 Claims, 15 Drawing Sheets

(56) References Cited

U.S. PATENT DOCUMENTS

| | | | |
|---|---|---|---|
| 2015/0268786 A1* | 9/2015 | Kitada | G06F 3/0414 345/173 |
| 2015/0296062 A1* | 10/2015 | Lee | G02F 1/133345 455/566 |
| 2017/0068377 A1* | 3/2017 | Kim | G06F 3/0416 |

* cited by examiner

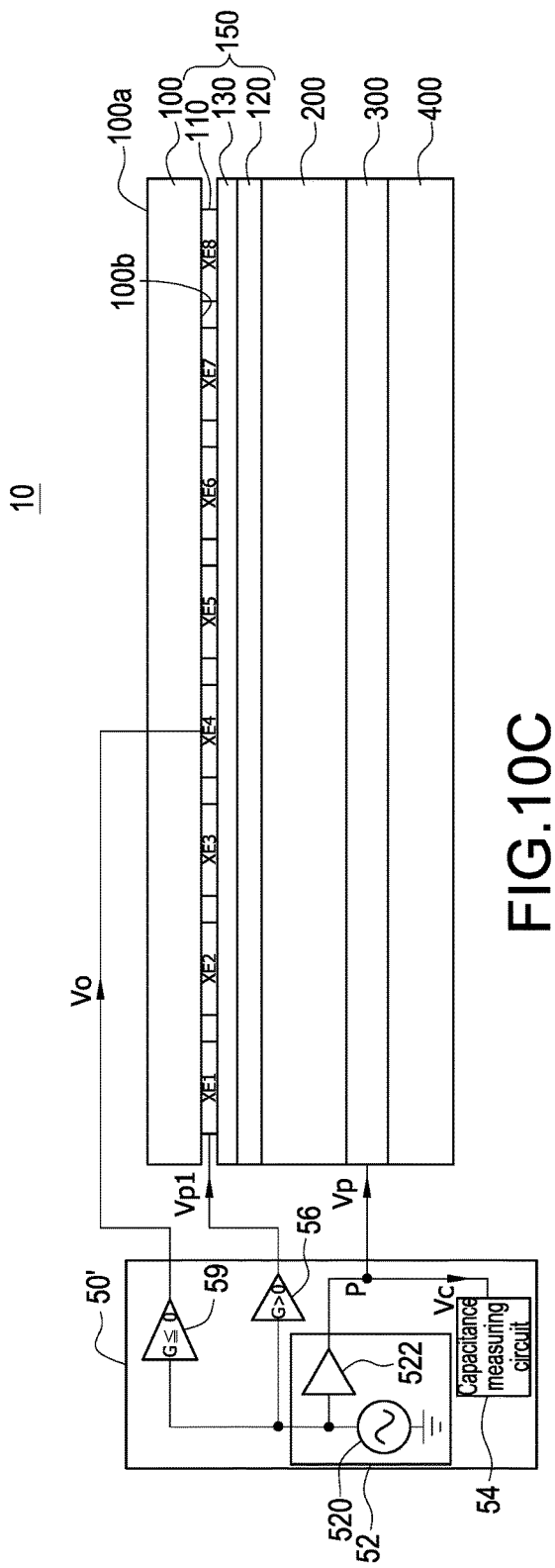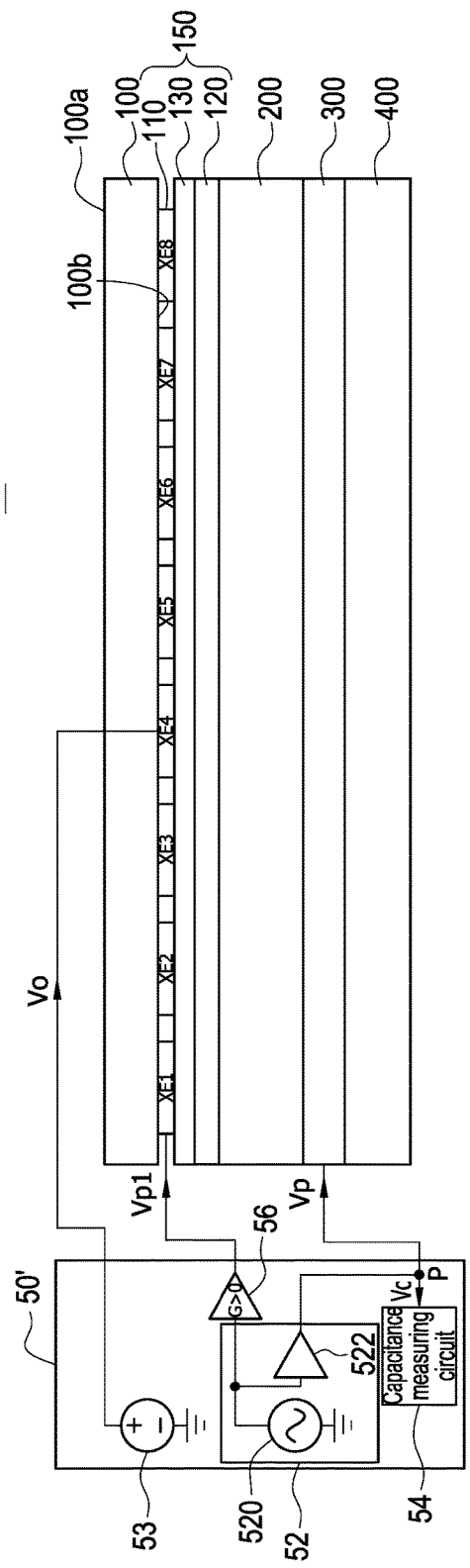

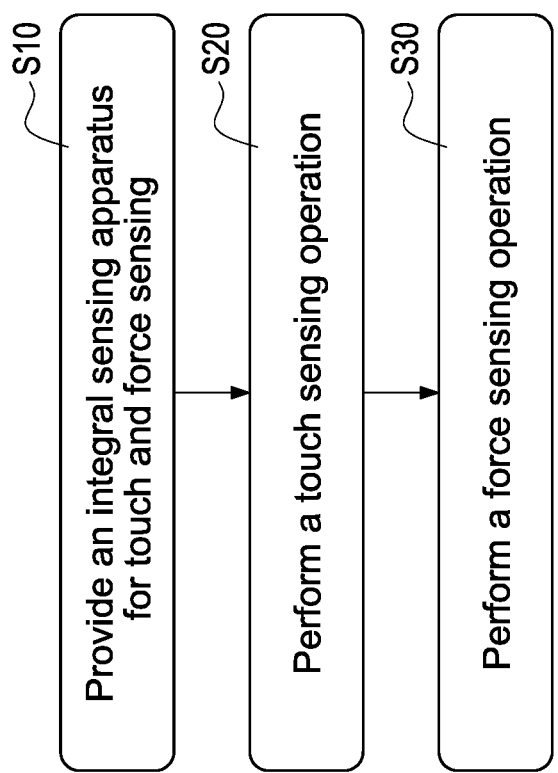

INTEGRAL SENSING APPARATUS FOR TOUCH AND FORCE SENSING AND METHOD FOR THE SAME

BACKGROUND OF THE INVENTION

Field of the Invention

The present invention relates to sensing apparatus, especially to an integral sensing apparatus for touch and force sensing.

Description of Prior Art

The touch display panels become popular as the market growing of the compact and lightweight mobile device. The force touch control technology has rapid development owing to the maturity of touch-control user interface and serious demand for 3D touch operation. The conventional force touch control panel generally integrates microelectromechanical sensor at edge or corner of the display panel to sense touch force on the display panel. The cost of the sensor is high and the assembling of the sensor is difficult. Besides, the conventional force touch control panel uses deformable resilient microstructure formed by complicated process to get better relevance between force and deformed degree. The force sensing can be improved by augmented physical variation. However, it still needs lots of effort to improve the force touch control panel.

SUMMARY OF THE INVENTION

It is an object of the present invention to provide an integral sensing apparatus for touch and force sensing to overcome above-mentioned drawbacks.

Accordingly, the present invention provides an integral sensing apparatus for touch and force sensing, the integral sensing apparatus comprising: a touch electrode layer having a plurality of first touch electrodes arranged along a first direction and a plurality of second touch electrodes arranged along a second direction substantially perpendicular to the first direction; a protection layer arranged on one side of the touch electrode layer; a force electrode layer having at least one force sensing electrode; a resilient dielectric layer arranged between the touch electrode layer and the force electrode layer; a capacitance sensing module electrically connected to the touch electrode layer and the force electrode layer; in touch sensing operation, the capacitance sensing module sequentially or randomly sending a touch driving signal to selected ones of the second touch electrodes, and sequentially or randomly receiving a touch sensing signal from selected ones of the first touch electrodes; in force sensing operation, the capacitance sensing module sending a force capacitance-exciting signal to the at least one force sensing electrode and obtains a force sensing signal from the force sensing electrode.

Accordingly, the present invention provides method for integral touch and force sensing, the method comprising: providing an integral sensing apparatus for touch and force sensing, the integral sensing apparatus comprising: a touch electrode layer having a plurality of first touch electrodes arranged along a first direction and a plurality of second touch electrodes arranged along a second direction substantially perpendicular to the first direction; a protection layer arranged on one side of the touch electrode layer; a force electrode layer having at least one force sensing electrode; a resilient dielectric layer arranged between the touch electrode layer and the force electrode layer; and a capacitance sensing module; in touch sensing operation, sequentially or randomly sending a touch driving signal to selected ones of the second touch electrodes, and sequentially or randomly receiving a touch sensing signal from selected ones of the first touch electrodes; in force sensing operation, sending a force capacitance-exciting signal to the at least one force sensing electrode and obtaining a force sensing signal from the force sensing electrode.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

FIG. 10C shows a schematic diagram of the integral sensing apparatus in force sensing operation.

FIG. 10D shows a schematic diagram of the integral sensing apparatus in force sensing operation.

FIG. 13 shows a flowchart for a method for integral touch and force sensing according to the present invention.

DETAILED DESCRIPTION OF THE INVENTION

Figure 9A:
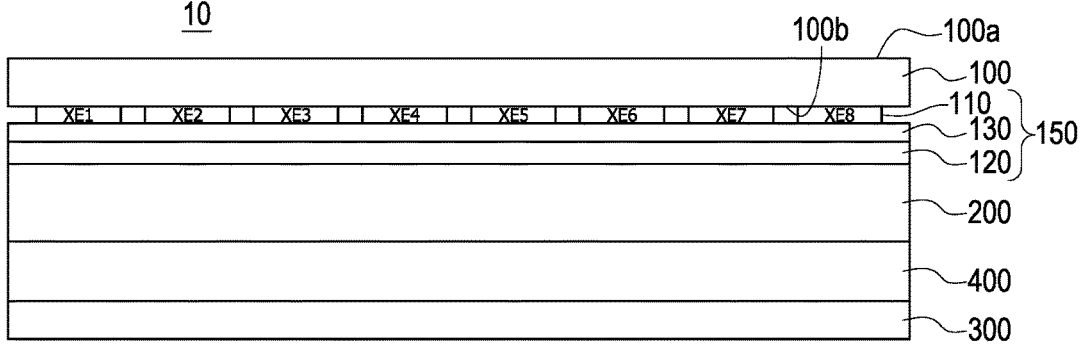
FIG. 9A shows a schematic sectional view of the integral sensing apparatus of the present invention.
Figure 9B:
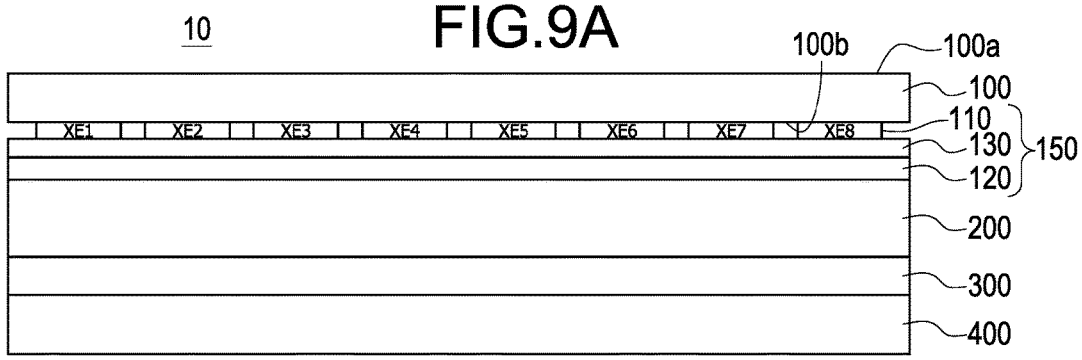
FIG. 9B shows a schematic sectional view of the integral sensing apparatus according to another embodiment of the present invention.

FIG. 9A shows a schematic sectional view of the integral sensing apparatus for touch and force sensing (hereinafter integral sensing apparatus) 10 of the present invention. The integral sensing apparatus 10 comprises, from top to bottom, a protection layer 100, a resilient dielectric layer 200, a substrate 400 and a force electrode layer 300. The protection layer 100 has a first face 100a and a second face 100b. A touch electrode layer 150 is arranged on the second face 100b. The touch electrode layer 150 has a plurality of first touch electrodes 110 (such as the first touch electrodes XE1~XE8 in this figure) extended along a first direction, a plurality of second touch electrodes 120 extended along a second direction, and an insulation layer 130, where the first direction is different with the second direction and may be substantially perpendicular to the second direction. It should be noted that FIG. 9A only shows a schematic sectional view, the arrangement and distribution of the first touch electrodes 110 and the second touch electrodes 120 can be varied. The first touch electrodes 110 are arranged on the second face 100b and the second touch electrodes 120 are arranged on a side of the insulation layer 130 opposite to the protection layer 100. The first touch electrodes 110 and the second touch electrodes 120 sandwich the insulation layer 130 therebetween, and the first touch electrodes 110 may electrically connect to other element (such as a capacitance sensing module 50 described later) by connection wire passing through the insulation layer 130. The force electrode layer 300 is arranged on a side of the touch electrode layer 150 opposite to the protection layer 100. The substrate 400 is placed between the resilient dielectric layer 200 and the force electrode layer 300. With reference to FIG. 9B, this figure shows a schematic sectional view of the integral sensing apparatus 10 according to another embodiment of the present invention. The embodiment shown in FIG. 9B is similar to that shown in FIG. 9A; however, the locations of the force electrode layer 300 and the substrate 400 switch. Namely, in the embodiment shown in FIG. 9B, the force electrode layer 300 is placed between the resilient dielectric layer 200 and the substrate 400. In the embodiment shown in FIG. 9B, the substrate 400 may be a color filter substrate for a display panel and the force electrode layer 300 is the static shielding layer of the display panel.

Figure 1:
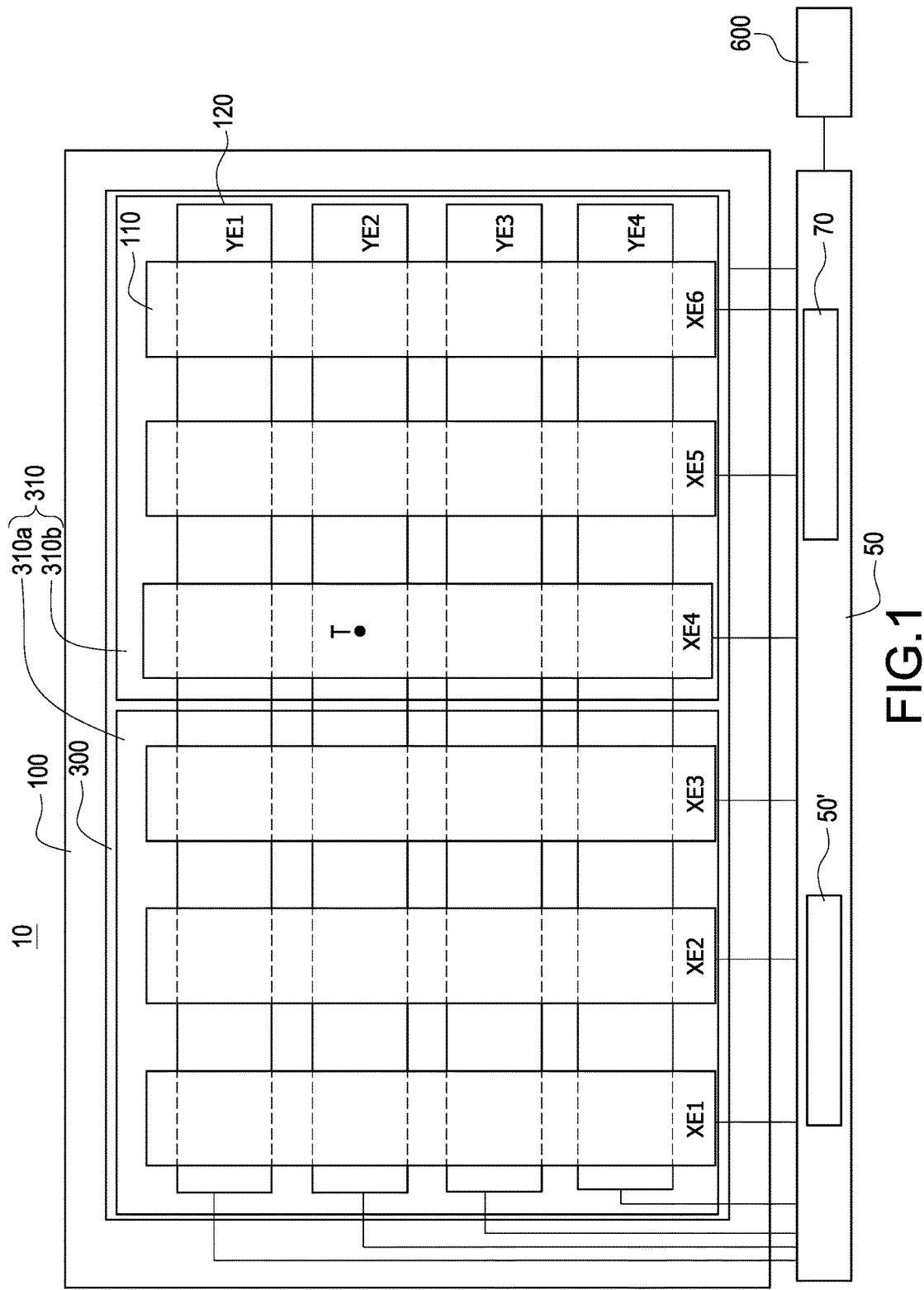
FIG. 1 shows a top view of the integral sensing apparatus according to an embodiment of the present invention.

FIG. 1 shows a top view of the integral sensing apparatus 10 according to an embodiment of the present invention, which mainly depicts the distribution of the first touch electrodes 110, the second touch electrodes 120 and the force electrode layer 300 from top view. It should be noted that part of the electrodes are purposely separated with each other to clearly show individual feature/location. The scales of the first touch electrodes 110, the second touch electrodes 120 and the force electrode layer 300 are not limited by this figure. The integral sensing apparatus 10 further comprises a capacitance sensing module 50, and the capacitance sensing module 50 has a self-capacitance sensing circuit 50' and a mutual-capacitance sensing circuit 70. The force electrode layer 300 has at least one force sensing electrode 310 (such as two force sensing electrodes 310a, 310b shown in FIG. 1). The first touch electrodes 110 (such as the first touch electrodes XE1~XE6 in this figure) extend along a first direction, the second touch electrodes 120 (such as the second touch electrodes YE1~YE4 in this figure) extend along a second direction where the first direction is different with the second direction and may be substantially perpendicular to the second direction. It should be noted FIG. 1 only shows a top view, the arrangement and distribution of the first touch electrodes 110 and the second touch electrodes 120 can be varied.

Figure 10A:
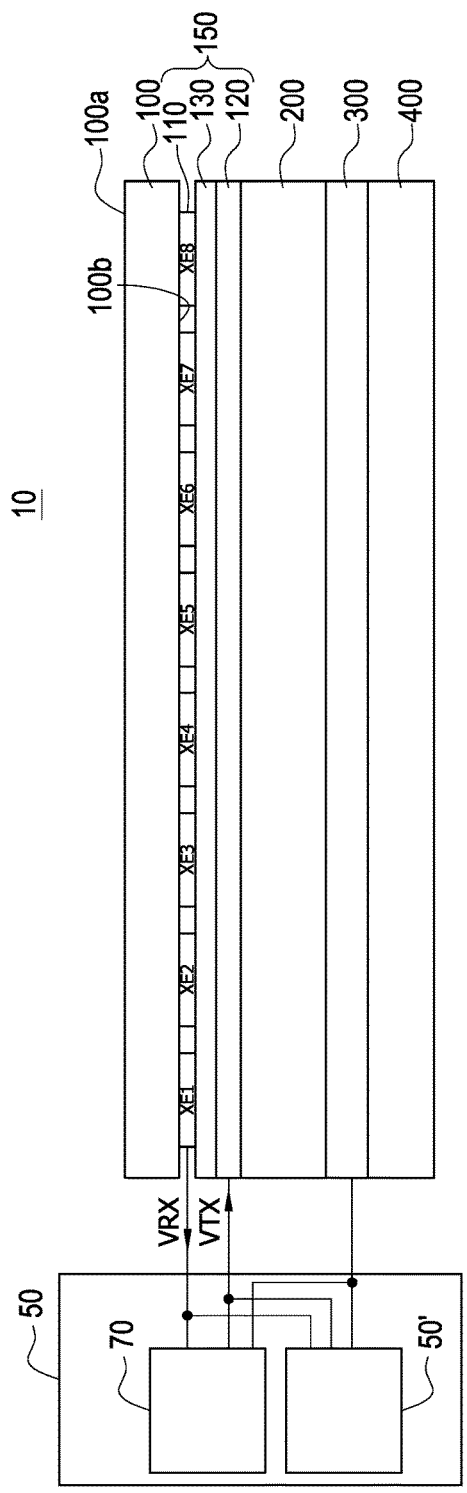
FIG. 10A shows a schematic diagram of the integral sensing apparatus in touch sensing operation.

FIG. 10A shows a schematic diagram of the integral sensing apparatus 10 in touch sensing operation. The mutual-capacitance sensing circuit 70 electrically connects to the first touch electrodes 110, the second touch electrodes 120 and the force electrode layer 300, while the self-capacitance sensing circuit 50' also electrically connects to the first touch electrodes 110, the second touch electrodes 120 and the force electrode layer 300. With reference also to FIG. 1, the first touch electrodes 110 are used as touch sensing electrodes to detect whether user finger touches the integral sensing apparatus 10 and the second touch electrodes 120 are used as touch driving electrodes. The mutual-capacitance sensing circuit 70 first selects one or more first touch electrode 110 and one or more second touch electrode 120 for touch sensing. In below description, multiple first touch electrodes 110 and second touch electrodes 120 are used for demonstration, it should be noted this application can also be applied to touch sensing with one first touch electrode 110 and one second touch electrode 120. The mutual-capacitance sensing circuit 70 sequentially or randomly sends a touch driving signal VTX to the selected second touch electrodes 120 and sequentially or randomly receives a touch sensing signal VRX from the selected first touch electrodes 110. By sensing the touch sensing signal VRX, the integral sensing apparatus 10 can identify whether a touch event occurs at a location corresponding to an intersection of the first touch electrode 110 and the second touch electrode 120. With reference to FIG. 1, by sending the touch driving signal VTX to the second touch electrode YE2 and sensing the touch sensing signal VRX from the first touch electrode XE4, the integral sensing apparatus 10 can identify whether a touch event occurs at a touch point T corresponding to an intersection of the second touch electrode YE2 and the first touch electrode XE4.

Figure 10B:
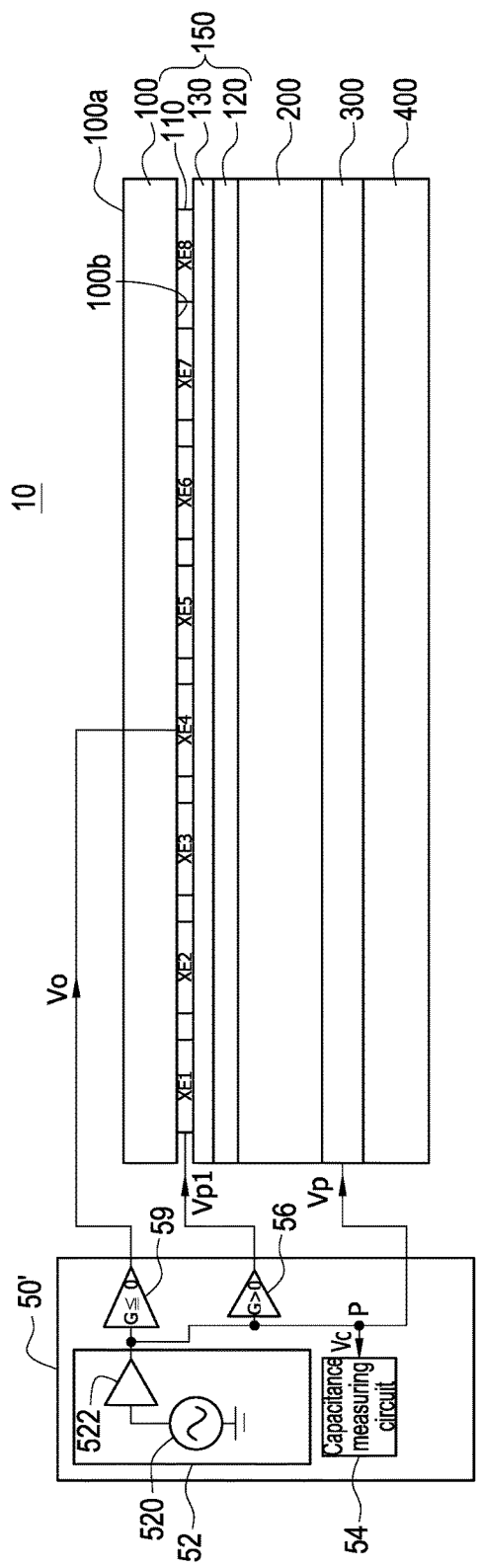
FIG. 10B shows a schematic diagram of the integral sensing apparatus in force sensing operation.

FIG. 10B shows a schematic diagram of the integral sensing apparatus 10 in force sensing operation. In force sensing operation, the self-capacitance sensing circuit 50' applies a force capacitance-exciting signal Vp to the force sensing electrode 310 (such as the force sensing electrode 310b shown in FIG. 1) corresponding to the touch point T. The "correspondence" means the touch point T is at least overlapped with one corresponding force sensing electrode 310b from projected view. The self-capacitance sensing circuit 50' sends the force capacitance-exciting signal Vp to the inverting amplifier 59 to generate a counter-exciting signal Vo. The self-capacitance sensing circuit 50' applies the counter-exciting signal Vo to a first touch electrode corresponding to the touch point T (namely the first touch electrode XE4). Alternatively, the self-capacitance sensing circuit 50' may apply the counter-exciting signal Vo to selected first touch electrodes for conducting force sensing with respect to those first touch electrodes, especially when force sensing is independently conducted with touch sensing. By applying the counter-exciting signal Vo, the accuracy of force sensing for the force sensing electrode 310b can be enhanced. In other word, after touch sensing, one or more touch point(s) and one or more corresponding first touch electrode(s) being touched can be determined. In later force sensing stage, the counter-exciting signal Vo can be applied sequentially or randomly to the selected first touch electrode(s), namely the first touch electrode(s) being touched or additionally selected first touch electrode(s) other than the touched first touch electrode(s), thereby enhancing accuracy of force sensing for the force sensing electrode 310b. Moreover, the self-capacitance sensing circuit 50' sends the force capacitance-exciting signal Vp to a non-inverting amplifier 56 (preferably with gain of 1) to generate a shielding signal Vp1 having the same phase as that of the force capacitance-exciting signal Vp. The shielding signal Vp1 is applied to the non-selected first touch electrodes XE1~XE3, XE5~XE8 (or at least part of the first touch electrodes near the selected first touch electrode XE4) to shield the influence from user finger. Moreover, other than the shielding signal Vp1, the self-capacitance sensing circuit 50' may apply a DC reference voltage (such as a zero volt voltage) to the non-selected first touch electrodes or float the non-selected first touch electrodes, namely, the non-selected first touch electrodes have no connection (NC).

FIG. 10C shows a schematic diagram of the integral sensing apparatus 10 in force sensing operation according to another embodiment of the present invention. The embodiment shown in FIG. 10C is similar to that shown in FIG. 10B. Similarly, the integral sensing apparatus 10 uses the inverting amplifier 59 to generate an alternating counter-exciting signal Vo with phase opposite to that of the force capacitance-exciting signal Vp for enhancing accuracy of force sensing for the force sensing electrode. However, in this embodiment, the input of the non-inverting amplifier 56 for generating the shielding signal Vp1 is not connected to the input of the capacitance measuring circuit 54 (for example, the input of the non-inverting amplifier 56 is directly connected to the signal source 520) to prevent the influence from the force sensing signal Vc at the input P of the capacitance measuring circuit 54.

FIG. 10D shows a schematic diagram of the integral sensing apparatus 10 in force sensing operation according to another embodiment of the present invention. The embodiment shown in FIG. 10D is similar to that shown in FIG. 10C. The embodiment shown in FIG. 10D replaces the inverting amplifier 59 with a DC reference signal source 53 and a DC reference signal from the DC reference signal source 53 is used as the counter-exciting signal Vo.

Figure 11A:
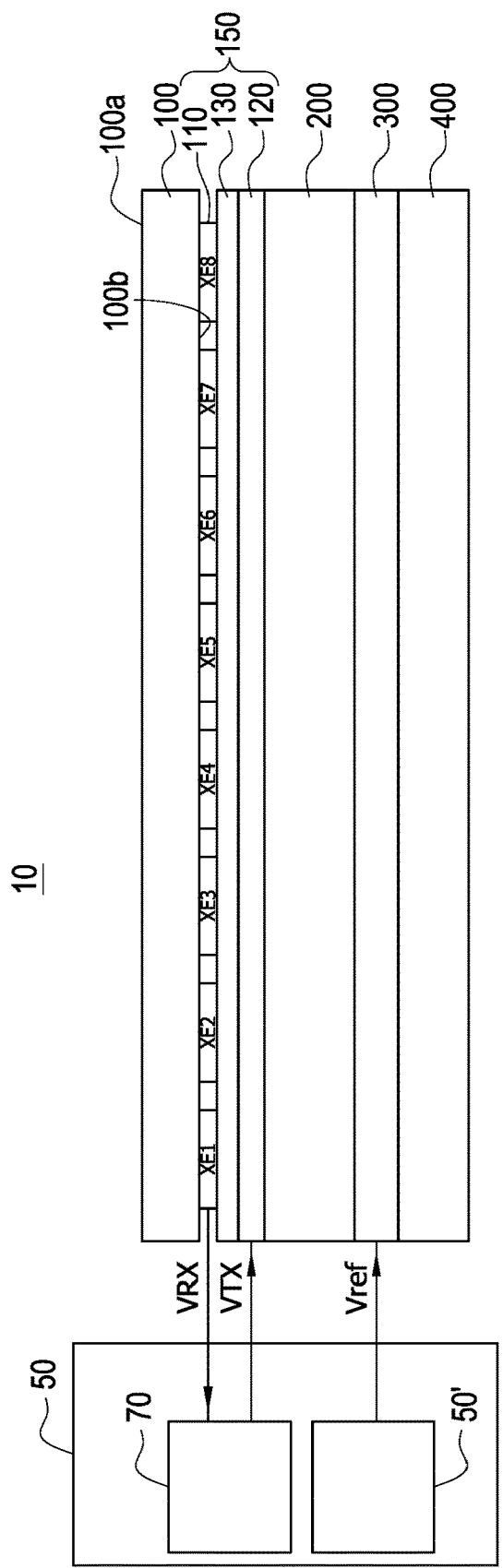
FIG. 11A shows a schematic diagram of the integral sensing apparatus in touch sensing operation.

FIG. 11A shows a schematic diagram of the integral sensing apparatus 10 in touch sensing operation. The embodiment in FIG. 11A is similar to that shown in FIG. 10A. In the duration when the mutual-capacitance sensing circuit 70 sequentially or randomly sends the touch driving signal VTX to the selected second touch electrodes 120 and sequentially or randomly receives the touch sensing signal VRX from the selected first touch electrodes 110, the self-capacitance sensing circuit 50' also applies a DC reference voltage Vref to the at least one force sensing electrode 310 to decrease or eliminate the measurement influence due to warp or deformation of the resilient dielectric layer 200.

Figure 11B:
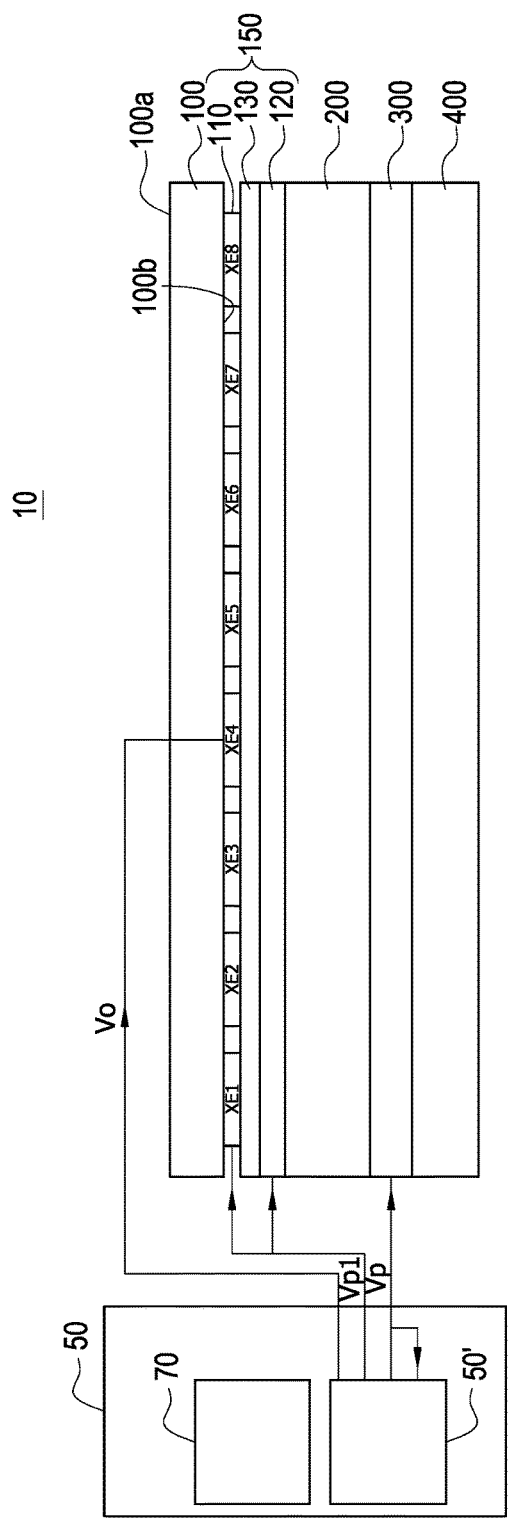
FIG. 11B shows a schematic diagram of the integral sensing apparatus in force sensing operation.

FIG. 11B shows a schematic diagram of the integral sensing apparatus 10 in force sensing operation according to another embodiment of the present invention. The embodiment in FIG. 11B is similar to that shown in FIG. 10B. In force sensing operation, the self-capacitance sensing circuit 50' applies a force capacitance-exciting signal Vp to the force sensing electrode 310 corresponding to the touch point T or corresponding to the selected first touch electrode. The self-capacitance sensing circuit 50' further applies, sequentially or randomly, the counter-exciting signal Vo to the selected first touch electrode (such as the first touch electrode XE4). Moreover, the self-capacitance sensing circuit 50' may further apply the counter-exciting signal Vo, at the same time as applying to the selected first touch electrode (or sequentially or randomly), to the selected second touch electrode (such as the second touch electrode YE2). The self-capacitance sensing circuit 50' may apply the shielding signal Vp1 to the non-selected first touch electrodes XE1~XE3, XE5~XE8 (or at least part of the first touch electrodes near the selected first touch electrode XE4) to shield the influence from user finger; and/or the self-capacitance sensing circuit 50' may apply the shielding signal Vp1 to the non-selected second touch electrodes YE1, YE3, and YE4 to shield the influence from user finger.

Figure 11C:
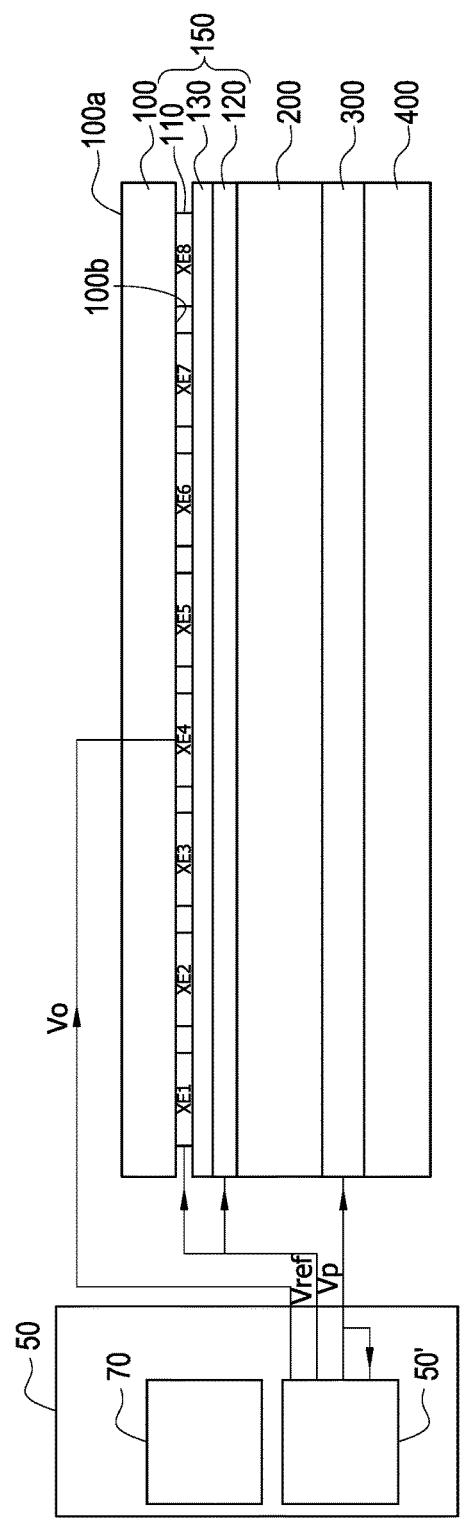
FIG. 11C shows a schematic diagram of the integral sensing apparatus in force sensing operation.

FIG. 11C shows a schematic diagram of the integral sensing apparatus 10 in force sensing operation according to another embodiment of the present invention. The embodiment in FIG. 11C is similar to that shown in FIG. 11B. In force sensing operation, the self-capacitance sensing circuit 50' applies a DC reference voltage Vref to the non-selected first touch electrodes XE1~XE3, XE5~XE8 (or at least part of the first touch electrodes near the selected first touch electrode XE4) to shield the influence from user finger; and/or the self-capacitance sensing circuit 50' may apply the DC reference voltage Vref to the non-selected second touch electrodes YE1, YE3, and YE4 to shield the influence from user finger. The DC reference voltage Vref may be a zero volt voltage.

Figure 2:
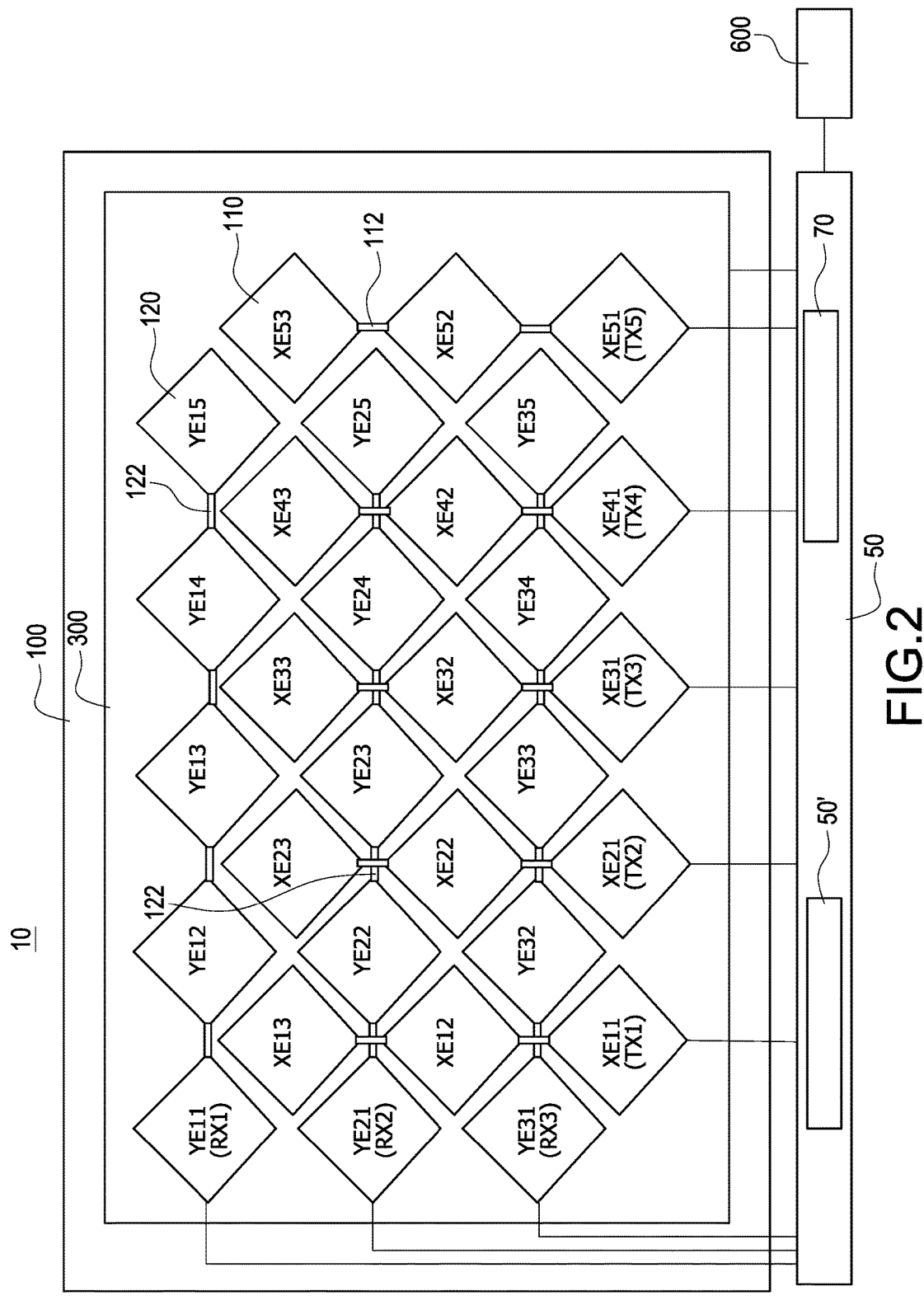
FIG. 2 shows a top view of the integral sensing apparatus according to another embodiment of the present invention.
Figure 9C:
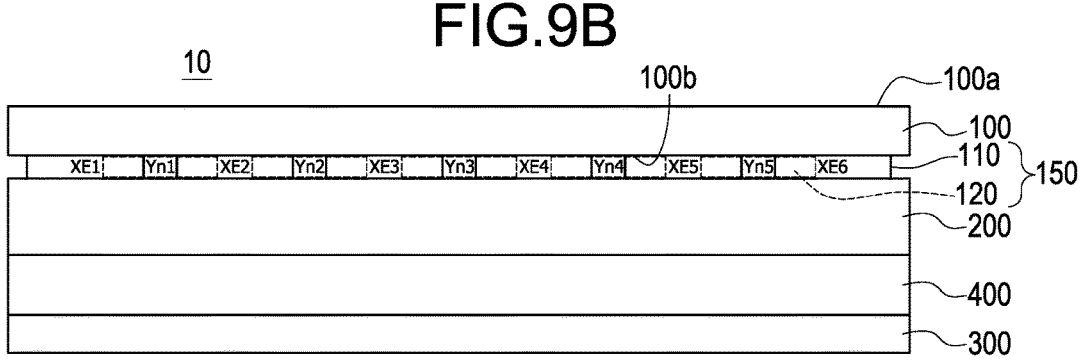
FIG. 9C shows a schematic sectional view of the integral sensing apparatus according to still another embodiment of the present invention.
Figure 9D:
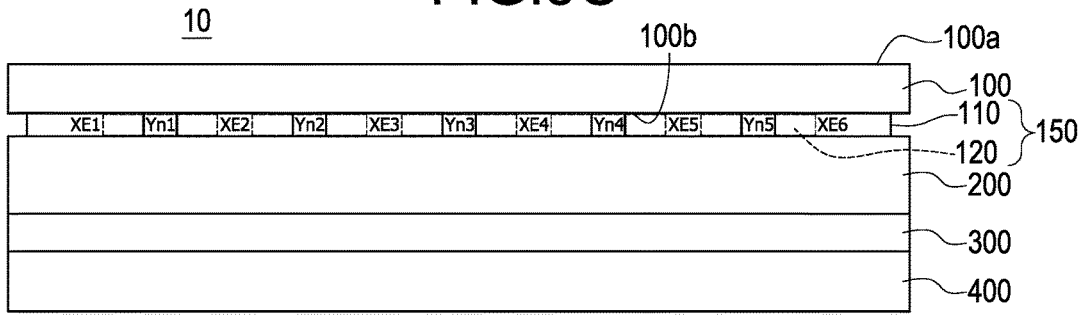
FIG. 9D shows a schematic sectional view of the integral sensing apparatus according to still another embodiment of the present invention.

FIG. 9C shows a schematic sectional view of the integral sensing apparatus 10 according to another embodiment of the present invention. The integral sensing apparatus 10 shown in FIG. 9C is similar to that shown in FIG. 9A, however, the first touch electrodes 110 and the second touch electrodes 120 of the touch electrode layer 150 are coplanar to each other. FIG. 9D shows a schematic sectional view of the integral sensing apparatus 10 according to another embodiment of the present invention. The integral sensing apparatus 10 shown in FIG. 9D is similar to that shown in FIG. 9C, however, the locations of the force electrode layer 300 and the substrate 400 switch. In the embodiment shown in FIG. 9D, the substrate 400 may be a color filter substrate for a display panel and the force electrode layer 300 is the static shielding layer of the display panel. FIG. 2 shows a top view of the integral sensing apparatus 10 according to another embodiment of the present invention, which is corresponding to the embodiments shown in FIGS. 9C and 9D. The first touch electrodes 110 in FIG. 2 extend along a first direction. The first touch electrodes 110 include, for example, five columns (TX1~TX5) of first touch electrodes XE11~XE13, XE21~XE23, XE31~XE33, XE41~XE43, and XE51~XE53, and the first touch electrodes in the same column are connected to each other by conductive bridges 112. The second touch electrodes 120 in FIG. 2 extend along a second direction. The second touch electrodes 120 include, for example, three rows (RX1~RX3) of second touch electrodes YE11~YE15, YE21~YE25, and YE31~YE35, and the second touch electrodes in the same row are connected to each other by conductive bridges 122. The first touch electrodes 110 and the second touch electrodes 120 are coplanar with each other. The first direction is different with the second direction and may be substantially perpendicular to the second direction. Moreover, insulation layers (not shown) are provided between the conductive bridges 112 and the conductive bridges 122 to prevent short circuit therebetween. The conductive bridges 112 and the conductive bridges 122 may be made with transparent conductive material such as Indium Tin oxide (ITO).

Figure 3:
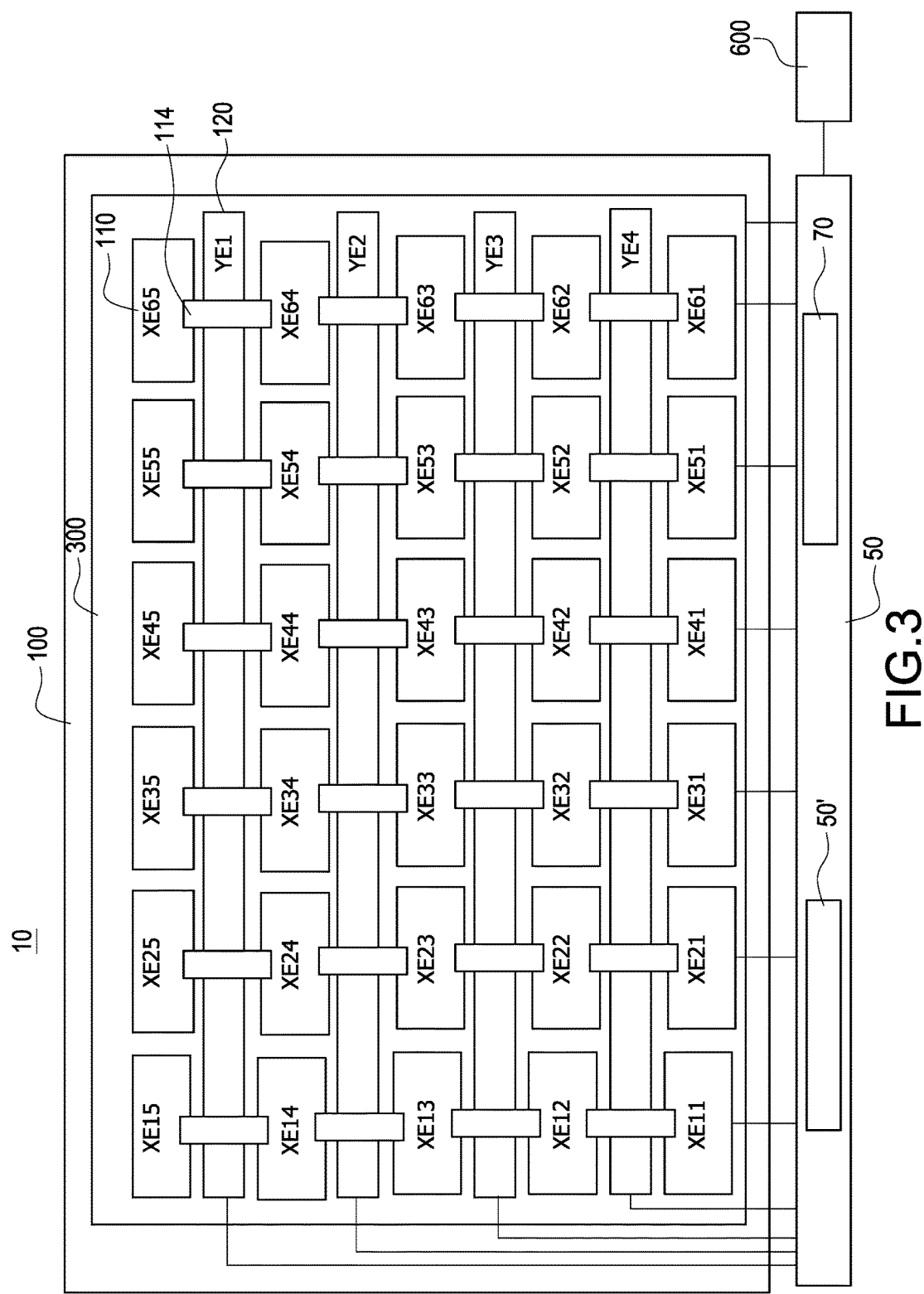
FIG. 3 shows a top view of the integral sensing apparatus according to still another embodiment of the present invention.

FIG. 3 shows a top view of the integral sensing apparatus 10 according to another embodiment of the present invention, which is corresponding to the embodiments shown in FIGS. 9C and 9D. The first touch electrodes 110 in FIG. 3 extend along a first direction. The first touch electrodes 110 include, for example, six columns of first touch electrodes XE11~XE15, XE21~XE25, XE31~XE35, XE41~XE45, XE51~XE53, and XE61~XE65, and the first touch electrodes in the same column are connected to each other by conductive wire 114. The second touch electrodes 120 in FIG. 3 (namely the second touch electrodes YE1~YE4) extend along a second direction. The first touch electrodes 110 and the second touch electrodes 120 are coplanar with each other. The first direction is different with the second direction and may be substantially perpendicular to the second direction. Moreover, insulation layers (not shown) are provided between the conductive wires 114 and the second touch electrodes 120 to prevent a short circuit therebetween.

Figure 4:
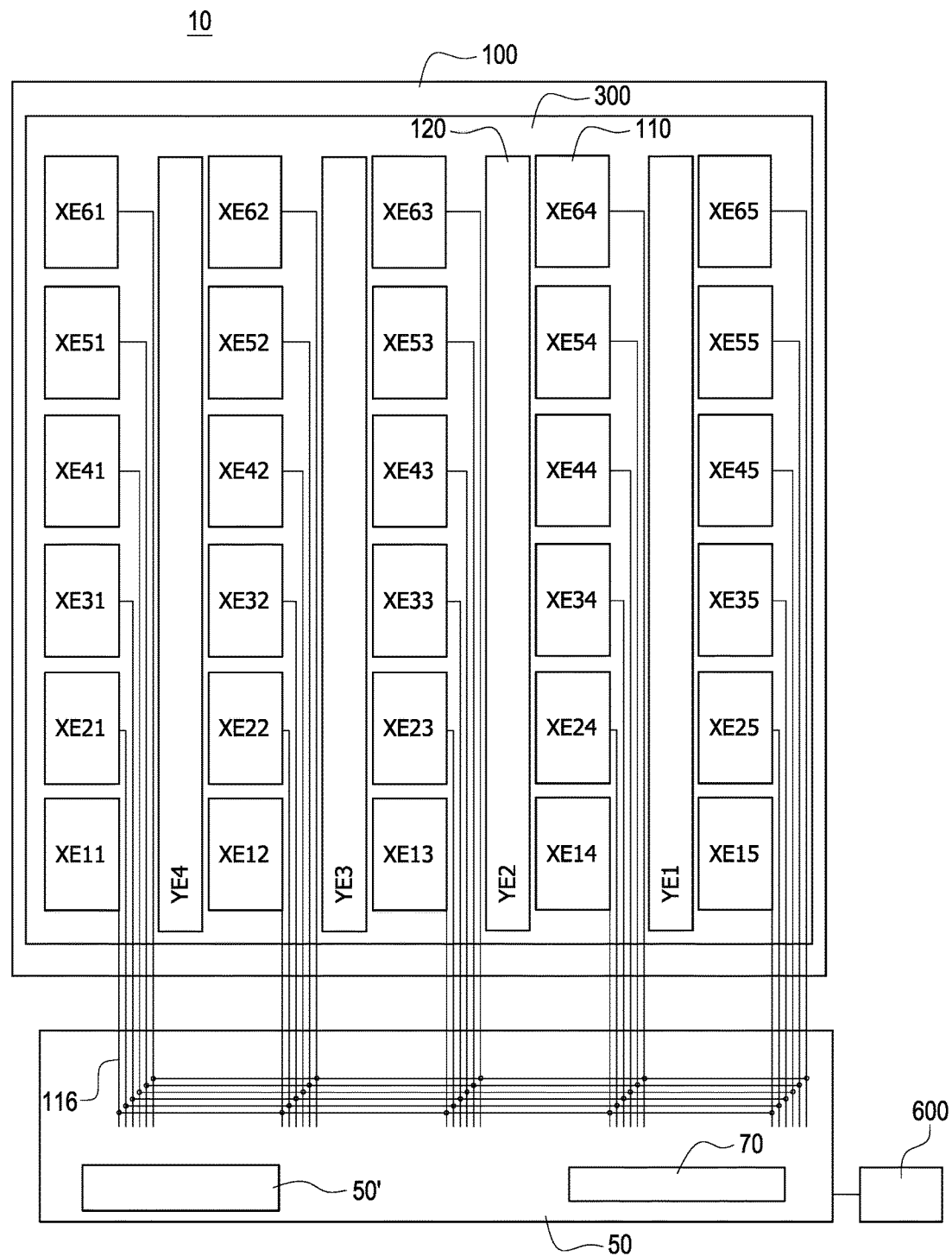
FIG. 4 shows a top view of the integral sensing apparatus according to still another embodiment of the present invention.

FIG. 4 shows a top view of the integral sensing apparatus 10 according to another embodiment of the present invention, which is corresponding to the embodiments shown in FIGS. 9C and 9D. The first touch electrodes 110 in FIG. 4 extend along a first direction. The first touch electrodes 110 include, for example, six rows of first touch electrodes XE11~XE15, XE21~XE25, XE31~XE35, XE41~XE45, XE51~XE53, and XE61~XE65. The second touch electrodes 120 in FIG. 4 (namely the second touch electrodes YE1~YE4) extend along a second direction. The first direction is different with the second direction and may be substantially perpendicular to the second direction. The first touch electrodes 110 and the second touch electrodes 120 connects to the capacitance sensing module 50 through conductive wires 116 and the signals sent to or received from the first touch electrodes 110/the second touch electrodes 120 are routed and switched in the capacitance sensing module 50. Therefore, the first touch electrodes 110 and the second touch electrodes 120 are coplanar with each other while the insulation layer/conductive bridges in FIGS. 2 and 3 are not needed.

Moreover, for the integral sensing apparatus 10 shown in FIGS. 9C, 9D, FIGS. 2-4, the touch and force measurement thereof can be conducted with embodiments in FIGS. 10A-11C.

Figure 5:
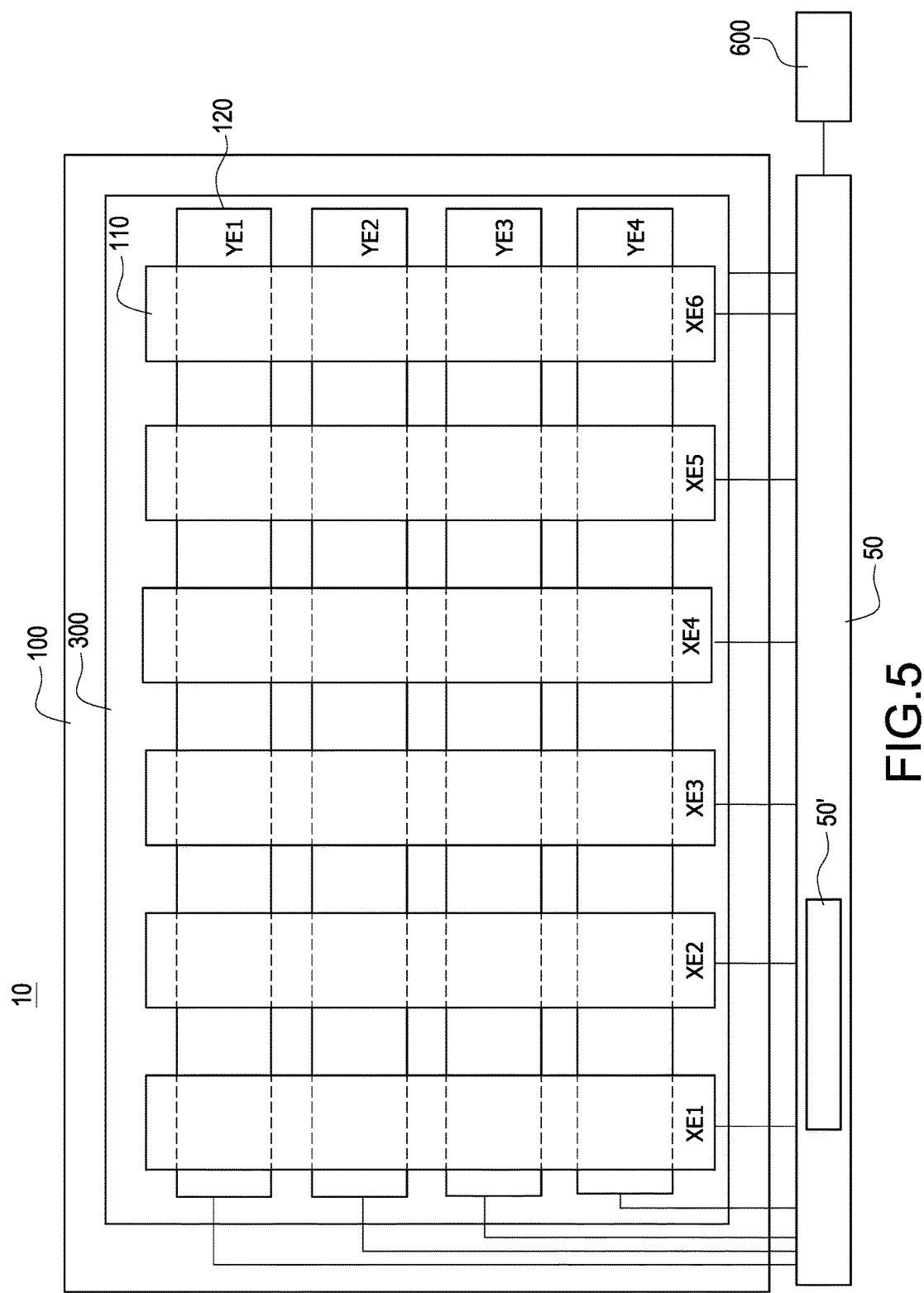
FIG. 5 shows a top view of the integral sensing apparatus according to still another embodiment of the present invention.

FIG. 5 shows a top view of the integral sensing apparatus 10 according to another embodiment of the present invention, which is similar to the embodiment in FIG. 1. However, the mutual-capacitance sensing circuit 70 is eliminated from the capacitance sensing module 50 in the embodiment shown in FIG. 5. The self-capacitance sensing circuit 50' of the capacitance sensing module 50 sends sequentially or randomly a touch capacitance-exciting signal to a selected first touch electrode and then receives a touch sensing signal from the selected first touch electrode. Afterward, the self-capacitance sensing circuit 50' of the capacitance sensing module 50 sends sequentially or randomly a touch capacitance-exciting signal to a selected second touch electrode and then receives a touch sensing signal from the selected second touch electrode. By sensing the touch sensing signal from the selected first/second touch electrode, the integral sensing apparatus 10 can identify whether a touch event occurs at interception of the selected first/second touch electrode. The touch capacitance-exciting signal may be a time varying (alternating) signal such as sinusoid wave signal, square wave signal, triangular wave signal or trapezoid wave signal.

Figure 6:
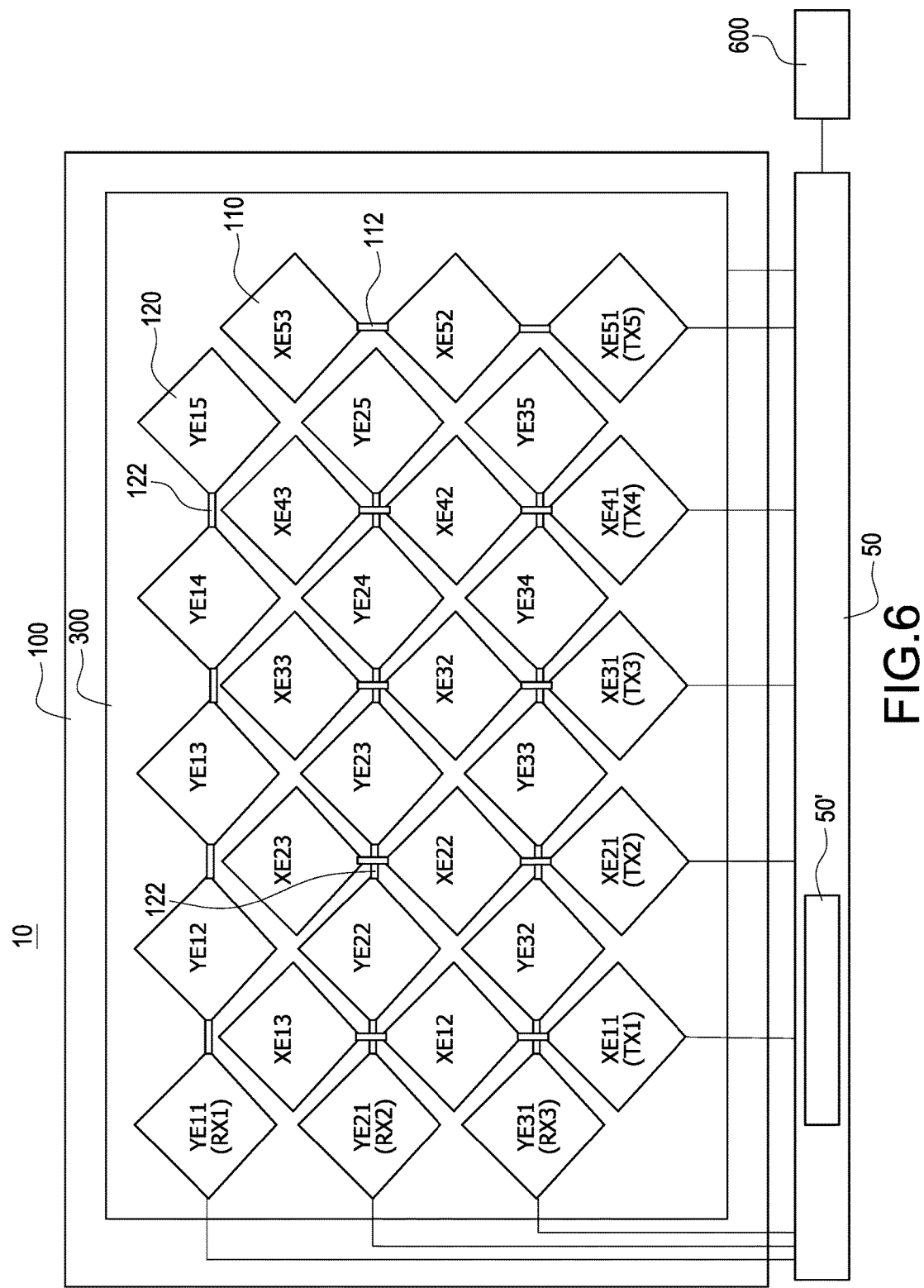
FIG. 6 shows a top view of the integral sensing apparatus according to still another embodiment of the present invention.

FIG. 6 shows a top view of the integral sensing apparatus 10 according to another embodiment of the present invention, which is similar to the embodiment in FIG. 2. However, the mutual-capacitance sensing circuit 70 is eliminated from the capacitance sensing module 50 in the embodiment shown in FIG. 6. The operation of the embodiment shown in FIG. 6 is similar to that of FIG. 5; the detailed description is omitted here for brevity.

Figure 7:
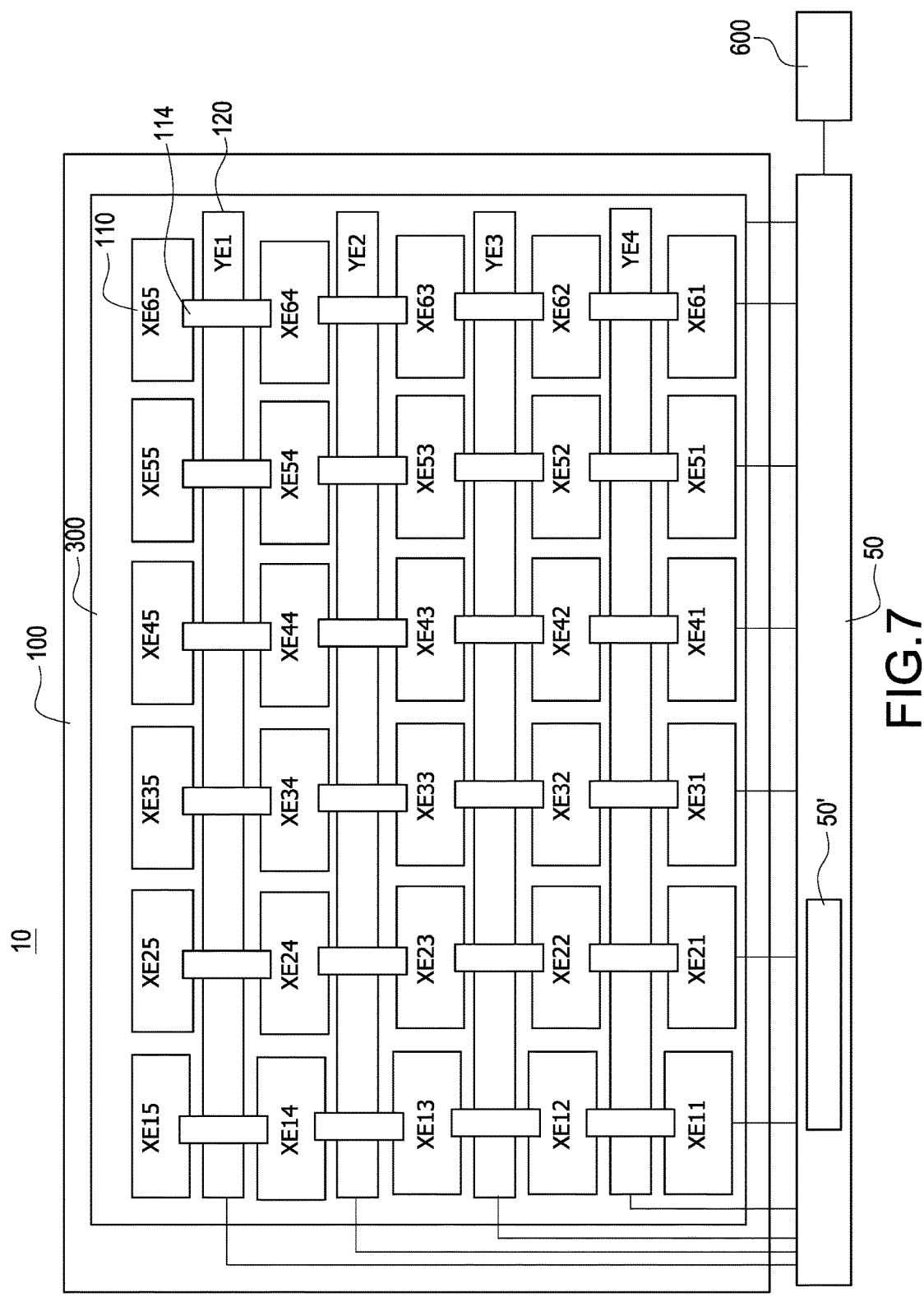
FIG. 7 shows a top view of the integral sensing apparatus according to still another embodiment of the present invention.

FIG. 7 shows a top view of the integral sensing apparatus 10 according to another embodiment of the present invention, which is similar to the embodiment in FIG. 3. However, the mutual-capacitance sensing circuit 70 is eliminated from the capacitance sensing module 50 in the embodiment shown in FIG. 7. The operation of the embodiment shown in FIG. 7 is similar to that of FIG. 5; the detailed description is omitted here for brevity.

Figure 8:
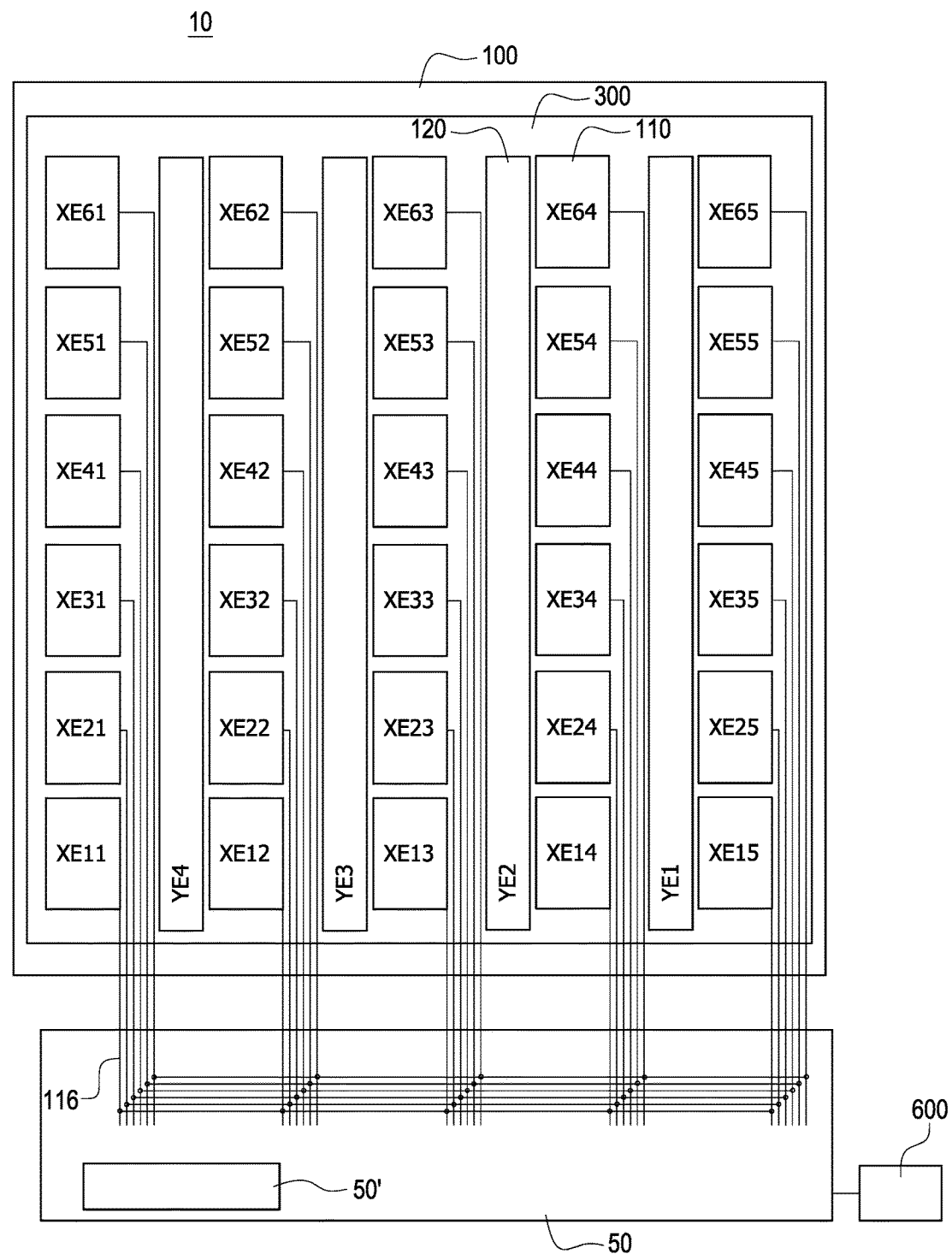
FIG. 8 shows a top view of the integral sensing apparatus according to still another embodiment of the present invention.

FIG. 8 shows a top view of the integral sensing apparatus 10 according to another embodiment of the present invention, which is similar to the embodiment in FIG. 4. However, the mutual-capacitance sensing circuit 70 is eliminated from the capacitance sensing module 50 in the embodiment shown in FIG. 8. The operation of the embodiment shown in FIG. 8 is similar to that of FIG. 5; the detailed description is omitted here for brevity.

Moreover, for the integral sensing apparatus 10 shown in FIGS. 5-8, the force sensing thereof can be referred to the description with respect to FIGS. 1-4 and FIGS. 10B-10D, the detailed description is omitted here for brevity.

Figure 12:
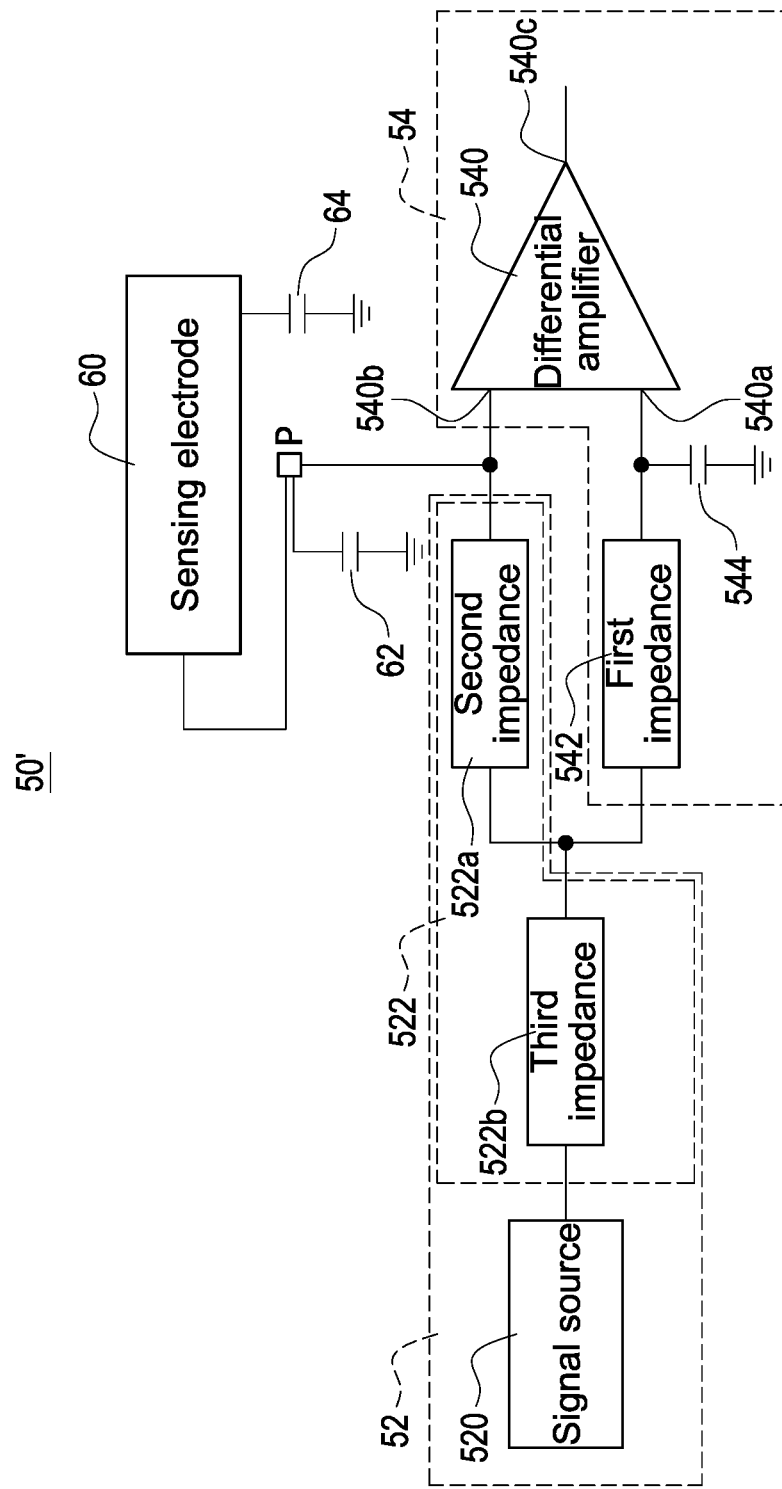
FIG. 12 shows the circuit diagram of the self-capacitance sensing circuit according to an embodiment of the present invention.

FIG. 12 shows the circuit diagram of the self-capacitance sensing circuit 50' according to an embodiment of the present invention. The self-capacitance sensing circuit 50' mainly comprises a capacitance-excitation driving circuit 52 and a capacitance measuring circuit 54 to sense a capacitance change at the sensing point P. The capacitance-excitation driving circuit 52 comprises a signal source 520 and a driving unit 522 (including a second impedance 522a and a third impedance 522b). The capacitance measuring circuit 54 comprises a differential amplifier 540, a first impedance 542 and a first capacitor 544 and is used to sense a capacitance change at a sensing electrode 60, where the sensing electrode 60 comprises a first stray capacitance 62 and a second stray capacitance 64.

The signal source 520 is electrically coupled with the first impedance 542 and the second impedance 522a. The first impedance 542 is electrically coupled with the first capacitor 544 and the first capacitor 544 is electrically coupled with the first input end 540a of the differential amplifier 540. The second impedance 522a is electrically coupled with the second input end 540b of the differential amplifier 540. The sensing electrode 60 is electrically coupled to the second impedance 522a and the second input end 540b through a node (such as an IC pin) of the self-capacitance sensing circuit 50'. The first stray capacitance 62 is electrically coupled to the node and the second stray capacitance 64 is electrically coupled to the sensing electrode 60.

In the self-capacitance sensing circuit 50' shown in FIG. 12, the sensing electrode 60 receives a touch signal when a finger or a conductor is touched thereon. The signal source 520 is a periodical signal and sent to the third impedance 522, while the resistance values of the first impedance 542 and the second impedance 522a are identical. The differential amplifier 540 will generate a differential touch signal after receiving the signal source 520 and the touch signal from the sensing electrode 60. In this embodiment, the capacitance of the first capacitor 544 is equal to the resulting capacitance of the first stray capacitance 62 in parallel connection with the second stray capacitance 64. The capacitance of the second stray capacitance 64 changes when user finger approaches or touches the sensing electrode 60. Therefore, the voltages fed to the first input end 540a and the second input end 540b will be different such that the differential amplifier 540 has a (non-zero) differential output at the output end 540c. In this way, the minute capacitance change on the sensing electrode 60 can be detected by the differential amplifier 540. Moreover, the noise from circuits or power source can be advantageously removed. The detail of the self-capacitance sensing circuit 50' can be referred to U.S. Pat. No. 8,704,539 (corresponding to Taiwan patent No. 1473001) filed by the same applicant.

FIG. 13 shows a flowchart for a method for integral touch and force sensing according to the present invention. The method comprises following steps. In step S10, an integral sensing apparatus for touch and force sensing is provided. The integral sensing apparatus comprises a protection layer 100 having a first face 100a and a second face 100b; a touch electrode layer 150 having a plurality of first touch electrodes 110 extended along a first direction, a plurality of second touch electrodes 120 extended along a second direction, and an insulation layer 130; a force electrode layer 300 having at least one force sensing electrode 310; a resilient dielectric layer 200 arranged between the touch electrode layer 150 and the force electrode layer 300, the resilient dielectric layer 200 being compressively deformed under pressure and restoring to original shape and volume if pressure is not present; a capacitance sensing module 50 (at least comprising the self-capacitance sensing circuit 50' shown in FIG. 12) and a processor 600. In step S20, a touch sensing operation is performed. In the touch sensing operation, the capacitance sensing circuit 50 sends sequentially or randomly a touch driving signal VTX to a plurality of selected second touch electrodes 120 (or sends a touch driving signal VTX to a selected second touch electrode 120) and receives sequentially or randomly a touch sensing signal VRX from the selected first touch electrodes 110 (or receives a touch sensing signal VRX from a selected first touch electrode 110), thus determining whether a touch event occurs and the corresponding touch point. In step S30, a force sensing operation is performed. In the force sensing operation, the capacitance sensing circuit 50 sequentially sends a force capacitance-exciting signal to the at least one corresponding force sensing electrode and obtains a force sensing signal from the second sensing electrode, thus performing the force sensing operation. After the step S20 of touch sensing operation is finished, the processor 600 may determine whether a touch event is sensed. The processor 600 sets a touch flag and records a coordinate of a touch point corresponding to the touch event if the touch event is sensed. The processor 600 clears or resets the touch flag if the touch event is not sensed. Moreover, the processor 600 may selectively decide to perform the force sensing operation or not according to the setting of touch flag or not.

In the step S20 of touch sensing operation, the capacitance sensing module 50 optionally sends a reference voltage (such as a DC reference voltage) to at least one corresponding force sensing electrode. In the step S30 of force sensing operation, the capacitance sensing module 50 may send a counter exciting signal to at least one selected first touch electrode and/or to at least one selected second touch electrode, where the counter exciting signal is a DC reference signal (such as a zero volt signal) or an alternating signal with phase opposite to phase of the force capacitance-exciting signal Vp. In the step S30 of force sensing operation, the capacitance sensing module 50 may send a signal with phase same as that of the force capacitance-exciting signal Vp to the non-selected first touch electrodes and/or to the non-selected second touch electrodes.

Moreover, in above embodiments, the protection layer is a glass substrate, a polymer thin film substrate or a cured coating layer to protect the touch electrodes from damage due to scratch, collision or moisture. The force capacitance-exciting signal (or the touch capacitance-exciting signal) may be an alternating signal such as sinusoid wave signal, square wave signal, triangular wave signal or trapezoid wave signal. The force capacitance-exciting signal (or the touch capacitance-exciting signal) may be a current source. The resilient dielectric layer comprises a resilient gelatinous material, the resilient gelatinous material is compressively deformed under pressure and restores to original shape and volume if pressure is not present. The resilient gelatinous material is, for example but not limited to, polydimethylsiloxane (PDMS), or optical clear adhesive (OCA). The substrate 400 is a glass substrate or polymer substrate. The DC reference voltage is for example a zero volt grounded voltage. The capacitance sensing module 50 comprises at least a self-capacitance sensing circuit.

Thus, particular embodiments have been described. Other embodiments are within the scope of the following claims. For example, the actions recited in the claims may be performed in a different order and still achieve desirable results.

What is claimed is:

1. An integral sensing apparatus for touch and force sensing, the integral sensing apparatus comprising:
    a touch electrode layer having a plurality of first touch electrodes arranged along a first direction and a plurality of second touch electrodes arranged along a second direction substantially perpendicular to the first direction;
    a protection layer arranged on one side of the touch electrode layer;
    a force electrode layer having at least one force sensing electrode;
    a resilient dielectric layer arranged between the touch electrode layer and the force electrode layer;
    a capacitance sensing module electrically connected to the touch electrode layer and the force electrode layer;
    in touch sensing operation, the capacitance sensing module sequentially or randomly sending a touch driving signal to selected ones of the second touch electrodes, and sequentially or randomly receiving a touch sensing signal from selected ones of the first touch electrodes;
    in force sensing operation, the capacitance sensing module sending a force capacitance-exciting signal to the at least one force sensing electrode along a first path connected to the at least one force sensing electrode and obtains a force sensing signal from the force sensing electrode along the first path;
    wherein the capacitance sensing module is configured to apply a signal with phase same as that of the force capacitance-exciting signal to non-selected first touch electrodes, which are different with the selected ones of the first touch electrodes and/or to non-selected second touch electrodes, which are different with the selected ones of the second touch electrodes in force sensing operation.

2. The integral sensing apparatus in claim 1, wherein the protection layer is a glass substrate, a polymer thin film substrate or a cured coating layer.

3. The integral sensing apparatus in claim 1, wherein the capacitance sensing module is configured to apply sequentially or randomly a counter-exciting signal to at least one of the selected first touch electrodes and/or to at least one of the selected second touch electrodes in force sensing operation.

4. The integral sensing apparatus in claim 1, wherein the capacitance sensing module is configured to apply a reference voltage to at least one of the force sensing electrode in touch sensing operation.

5. The integral sensing apparatus in claim 1, wherein the capacitance sensing module comprises a mutual-capacitance sensing circuit and a self-capacitance sensing circuit, the mutual-capacitance sensing circuit senses a touch point in the touch sensing operation, the self-capacitance sensing circuit senses self-capacitance change of the force sensing electrode in force sensing operation.

6. The integral sensing apparatus in claim 1, wherein the resilient dielectric layer comprises a resilient gelatinous material, the resilient gelatinous material is compressively deformed under pressure and restores to original shape and volume if pressure is not present.

7. The integral sensing apparatus in claim 1, wherein the the touch sensing operation and the force sensing operation are conducted in different time.

8. The integral sensing apparatus in claim 1, wherein the force capacitance-exciting signal is an alternating signal.

9. The integral sensing apparatus in claim 3, wherein the counter-exciting signal is a DC reference signal or an alternating signal with phase opposite to phase of the force capacitance-exciting signal.

10. The integral sensing apparatus in claim 9, wherein the DC reference signal is a zero volt signal.

11. The integral sensing apparatus in claim 1, further comprising a substrate arranged on one side of the resilient dielectric layer and opposite to the protection layer, the substrate is a glass substrate or a polymer substrate.

12. The integral sensing apparatus in claim 11, wherein the substrate is a color filter substrate for a display panel and the force electrode layer is a static shielding layer of the display panel.

13. A method for integral touch and force sensing, the method comprising:
providing an integral sensing apparatus for touch and force sensing, the integral sensing apparatus comprising: a touch electrode layer having a plurality of first touch electrodes arranged along a first direction and a plurality of second touch electrodes arranged along a second direction substantially perpendicular to the first direction; a protection layer arranged on one side of the touch electrode layer; a force electrode layer having at least one force sensing electrode; a resilient dielectric layer arranged between the touch electrode layer and the force electrode layer; and a capacitance sensing module;
in touch sensing operation, sequentially or randomly sending a touch driving signal to selected ones of the second touch electrodes, and sequentially or randomly receiving a touch sensing signal from selected ones of the first touch electrodes;
in force sensing operation, sending a force capacitance-exciting signal to the at least one force sensing electrode along a first path connected to the at least one force sensing electrode and obtaining a force sensing signal from the force sensing electrode along the first path;
in force sensing operation, further applying a signal with phase same as that of the force capacitance-exciting signal to non-selected first touch electrodes, which are different with the selected ones of the first touch electrodes and/or applying the signal with phase same as that of the force capacitance-exciting signal to non-selected second touch electrodes, which are different with the selected ones of the second touch electrodes.

14. The method in claim 13, further comprising:
determining whether a touch event is sensed after the touch sensing operation is finished; and
performing the force sensing operation if the touch event is sensed.

15. The method in claim 13, further comprising:
determining whether a touch event is sensed in the touch sensing operation; and
setting a touch flag and a recording a coordinate of a touch point corresponding to the touch event if the touch event is sensed; and
clearing or resetting the touch flag if the touch event is not sensed.

16. The method in claim 15, wherein the force sensing operation is selectively performed according to the setting of touch flag or not.

17. The method in claim 13, wherein the force capacitance-exciting signal is an alternating signal.

18. The method in claim 17, further comprising:
applying a reference voltage to the at least one force sensing electrode in the touch sensing operation.

19. The method in claim 17, further comprising:
applying a counter-exciting signal to at least one of the selected first touch electrodes and/or to at least one of the selected second touch electrodes in force sensing operation.

20. The method in claim 19, wherein the counter-exciting signal is a DC reference signal or an alternating signal with phase opposite to phase of the force capacitance-exciting signal.

21. The method in claim 20, wherein the DC reference signal is a zero volt grounded signal.

22. The method in claim 13, wherein the touch sensing operation and the force sensing operation are conducted in different time.

23. The method in claim 13, wherein the capacitance sensing module comprises at least a self-capacitance sensing circuit.

* * * * *